United States Patent
Surace et al.

(10) Patent No.: US 10,132,191 B2
(45) Date of Patent: Nov. 20, 2018

(54) VARIABLE AREA TURBINE ARRANGEMENT WITH SECONDARY FLOW MODULATION

(71) Applicant: UNITED TECHNOLOGIES CORPORATION, Farmington, CT (US)

(72) Inventors: Raymond Surace, Newington, CT (US); Eric A. Hudson, Harwinton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 366 days.

(21) Appl. No.: 14/912,476

(22) PCT Filed: Aug. 13, 2014

(86) PCT No.: PCT/US2014/050862
§ 371 (c)(1),
(2) Date: Feb. 17, 2016

(87) PCT Pub. No.: WO2015/026597
PCT Pub. Date: Feb. 26, 2015

(65) Prior Publication Data
US 2016/0201491 A1    Jul. 14, 2016

Related U.S. Application Data

(60) Provisional application No. 61/868,121, filed on Aug. 21, 2013.

(51) Int. Cl.
*F01D 9/06* (2006.01)
*F01D 17/16* (2006.01)
(Continued)

(52) U.S. Cl.
CPC .......... *F01D 17/162* (2013.01); *F01D 9/065* (2013.01); *F01D 11/24* (2013.01); *F01D 17/16* (2013.01); *F02C 7/12* (2013.01); *F05D 2260/205* (2013.01)

(58) Field of Classification Search
None
See application file for complete search history.

(56) References Cited

U.S. PATENT DOCUMENTS 3,314,654 A    4/1967 Thenault et al.
3,471,126 A *  10/1969 Abild ................... F01D 5/18
                                            415/110

(Continued)

OTHER PUBLICATIONS

The Extended European Search Report for EP Application No. 14837668.4, dated Feb. 22, 2017.

(Continued)

*Primary Examiner* — Igor Kershteyn
*Assistant Examiner* — Theodore Ribadeneyra
(74) *Attorney, Agent, or Firm* — Carlson, Gaskey & Olds, P.C.

(57) ABSTRACT

A variable area turbine arrangement according to an exemplary aspect of the present disclosure includes, among other things, a variable vane assembly and a secondary flow system associated with the variable vane assembly. Flow modulation of a cooling fluid through the secondary flow system is changed simultaneously with actuation of the variable vane assembly.

20 Claims, 7 Drawing Sheets

(51) Int. Cl.
  *F01D 11/24* (2006.01)
  *F02C 7/12* (2006.01)

(56) References Cited

U.S. PATENT DOCUMENTS

| | | | | |
|---|---|---|---|---|
| 3,663,118 A | * | 5/1972 | Johnson | F01D 17/162 415/116 |
| 3,850,544 A | * | 11/1974 | Ciokajlo | F01D 9/065 415/149.4 |
| 4,025,227 A | | 5/1977 | Greenberg et al. | |
| 4,169,692 A | * | 10/1979 | McDonough | F01D 5/189 415/115 |
| 4,193,738 A | * | 3/1980 | Landis, Jr. | F01D 11/005 277/387 |
| 4,741,667 A | | 5/1988 | Price et al. | |
| 4,861,228 A | | 8/1989 | Todman | |
| 5,517,817 A | * | 5/1996 | Hines | F01D 17/162 415/115 |
| 5,683,225 A | | 11/1997 | Orlando et al. | |
| 8,007,229 B2 | | 8/2011 | McCaffrey et al. | |
| 8,202,043 B2 | | 6/2012 | McCaffrey | |
| 8,393,857 B2 | | 3/2013 | Copeland et al. | |
| 2003/0223856 A1 | | 12/2003 | Yuri et al. | |
| 2007/0020092 A1 | * | 1/2007 | Giaimo | F01D 17/162 415/160 |
| 2008/0206045 A1 | * | 8/2008 | Foucher | F01D 17/162 415/160 |
| 2009/0097966 A1 | | 4/2009 | McCaffrey | |
| 2010/0202873 A1 | | 8/2010 | Andrew | |
| 2010/0232935 A1 | * | 9/2010 | Twell | F01D 17/162 415/151 |
| 2012/0093632 A1 | | 4/2012 | Crespo et al. | |
| 2013/0031913 A1 | | 2/2013 | Little | |

OTHER PUBLICATIONS

International Search Report and Written Opinion of the International Searching Authority for International application No. PCT/US2014/050862 dated Nov. 20, 2014.

International Preliminary Report on Patentability for PCT Application No. PCT/US2014/050862, dated Mar. 3, 2016.

* cited by examiner

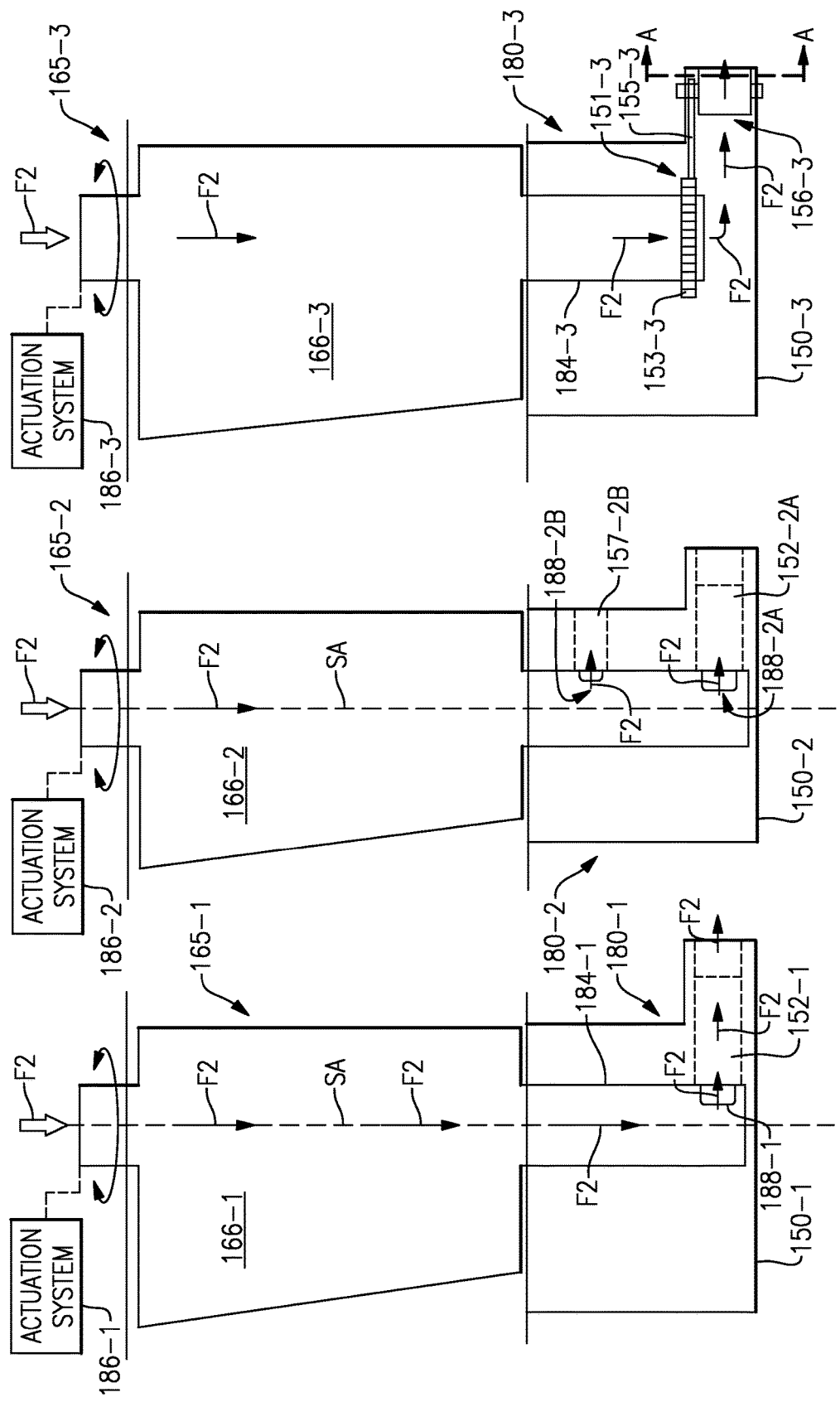

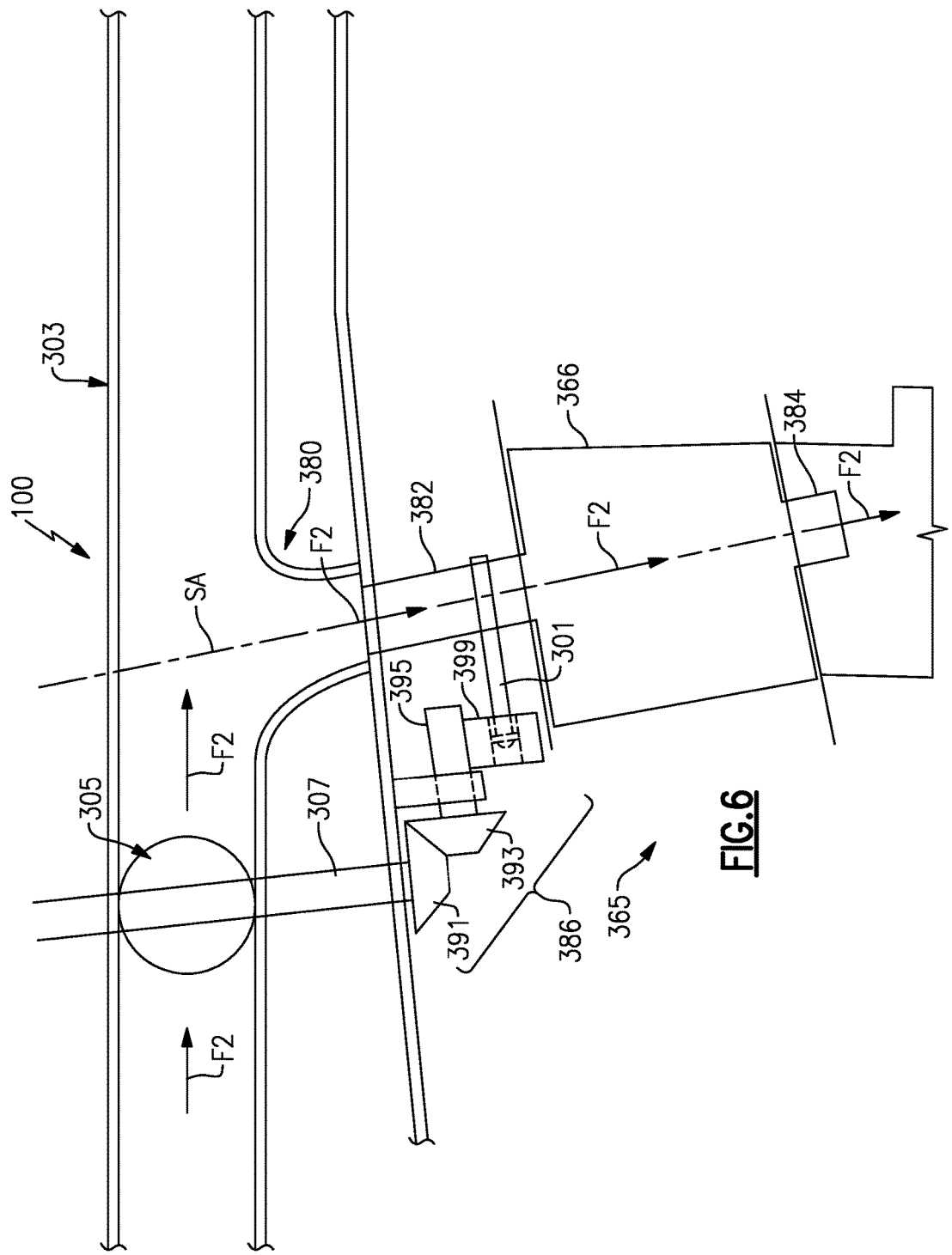

VARIABLE AREA TURBINE ARRANGEMENT WITH SECONDARY FLOW MODULATION

This invention was made with government support under Contract No. N00014-09-D-0821-0006, awarded by the United States Navy. The government therefore has certain rights in this invention.

BACKGROUND

This disclosure relates to a gas turbine engine, and more particularly to a variable area turbine arrangement that provides secondary flow modulation.

Gas turbine engines typically include at least a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

The compressor and turbine sections of a gas turbine engine typically include multiple stages of alternating rows of rotating blades and flow directing vanes. The rotating blades of the turbine section extract energy from the airflow that is communicated through the gas turbine engine, while the vanes direct the airflow to a downstream row of blades.

The vanes can be manufactured to a fixed flow area that is optimized for a single flight point. Alternatively, it is possible to alter the flow area between two adjacent vanes by providing one or more variable vanes that rotate about a given axis to vary the flow area. Altering the flow area in this manner changes the pressure distributions of the variable vane as well as nearby hardware. The pressure distribution changes can alter the amount of cooling fluid necessary to condition the vanes and surrounding hardware.

SUMMARY

A variable area turbine arrangement according to an exemplary aspect of the present disclosure includes, among other things, a variable vane assembly and a secondary flow system associated with the variable vane assembly. Flow modulation of a cooling fluid through the secondary flow system is changed simultaneously with actuation of the variable vane assembly.

In a further non-limiting embodiment of the foregoing variable area turbine arrangement, the variable vane assembly includes a spindle having a window and the secondary flow system includes a tube having a port configured to align with the window.

In a further non-limiting embodiment of either of the foregoing variable area turbine arrangements, the spindle is configured to rotate about a spindle axis to move the window relative to the port.

In a further non-limiting embodiment of any of the foregoing variable area turbine arrangements, the spindle is configured to rotate between a first position in which the port is covered by the spindle and a second position in which the port at least partially aligns with the window to permit a portion of the cooling fluid to enter the port.

In a further non-limiting embodiment of any of the foregoing variable area turbine arrangements, the variable vane assembly includes a spindle having a window and the secondary flow system includes a TOBI assembly having at least one passage that is selectively exposed to the window to alter an amount of the cooling fluid communicated through the secondary flow system.

In a further non-limiting embodiment of any of the foregoing variable area turbine arrangements, the variable vane assembly includes a spindle and the secondary flow system includes a TOBI assembly having at least one exit nozzle vane linked to the spindle through a linkage assembly.

In a further non-limiting embodiment of any of the foregoing variable area turbine arrangements, the variable vane assembly includes a spindle and the secondary flow system includes a TOBI assembly having at least one rotating blocker linked to the spindle through a linkage assembly.

In a further non-limiting embodiment of any of the foregoing variable area turbine arrangements, the variable vane assembly includes a spindle having a window and the secondary flow system includes a port disposed through a platform, the window being selectively moved relative to the port to alter an amount of the cooling fluid communicated through the secondary flow system.

In a further non-limiting embodiment of any of the foregoing variable area turbine arrangements, the variable vane assembly includes an actuation system having at least one gear that is moveable to expose a port of the secondary flow system.

In a further non-limiting embodiment of any of the foregoing variable area turbine arrangements, the variable vane assembly includes an actuation system and the secondary flow system includes a cooling pipe and a modulation valve disposed in the cooling pipe, the actuation system configured to simultaneously move a portion of the variable vane and the modulation valve.

A gas turbine engine according to an exemplary aspect of the present disclosure includes, among other things, a turbine section and a variable vane assembly disposed within the turbine section. A secondary flow system is configured to communicate a cooling fluid to at least one of the variable vane assembly and nearby hardware of the turbine section. A portion of the variable vane assembly is configured to move and simultaneously modulate a flow of the cooling fluid through the secondary flow system.

In a further non-limiting embodiment of the foregoing gas turbine engine, the variable vane assembly includes a variable airfoil that is movable to modulate the flow of the cooling fluid.

In a further non-limiting embodiment of either of the foregoing gas turbine engines, an actuation system is configured to modulate the flow of the cooling fluid.

In a further non-limiting embodiment of any of the foregoing gas turbine engines, the secondary flow system includes a TOBI assembly radially inboard of the variable vane assembly.

In a further non-limiting embodiment of any of the foregoing gas turbine engines, the secondary flow system includes at least one of a port, a nozzle, a passage and a modulation valve.

A method according to another exemplary aspect of the present disclosure includes, among other things, moving a portion of a variable vane assembly to alter flow area associated with a variable area turbine arrangement and simultaneously with the step of moving, modulating a flow of a cooling fluid through a secondary flow system associated with the variable vane assembly.

In a further non-limiting embodiment of the foregoing method, the method includes utilizing a variable airfoil of the variable vane assembly to modulate the flow through the secondary flow system.

In a further non-limiting embodiment of either of the foregoing methods, the method includes utilizing an actuation system to modulate the flow through the secondary flow system.

In a further non-limiting embodiment of any of the foregoing methods, the method includes conditioning a variable airfoil of the variable vane assembly with the cooling fluid.

In a further non-limiting embodiment of any of the foregoing methods, the method includes conditioning nearby hardware of the variable area turbine arrangement with the cooling fluid.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 4A, 4B, 4C, and 4D illustrate additional variable vane assemblies and associated secondary flow systems.

FIG. 6 illustrates another variable vane assembly and associated secondary flow system.

DETAILED DESCRIPTION

This disclosure is directed to a variable area turbine arrangement for a gas turbine engine. Among other features, the variable area turbine arrangement includes a variable vane assembly and a secondary flow system associated with the variable vane assembly. The variable vane assembly includes a variable airfoil and an actuation system. Either the vane airfoil itself or the actuation system may be used to modulate a flow of a cooling fluid through the secondary flow system to condition the variable vane assembly and/or nearby hardware of the variable area turbine arrangement. Coupling actuation of the variable vane assembly and the secondary flow system reduces hardware requirements, thereby reducing weight, cost, and complexity of the variable area turbine arrangement. These and other features are described in detail within this disclosure.

Figure 1:
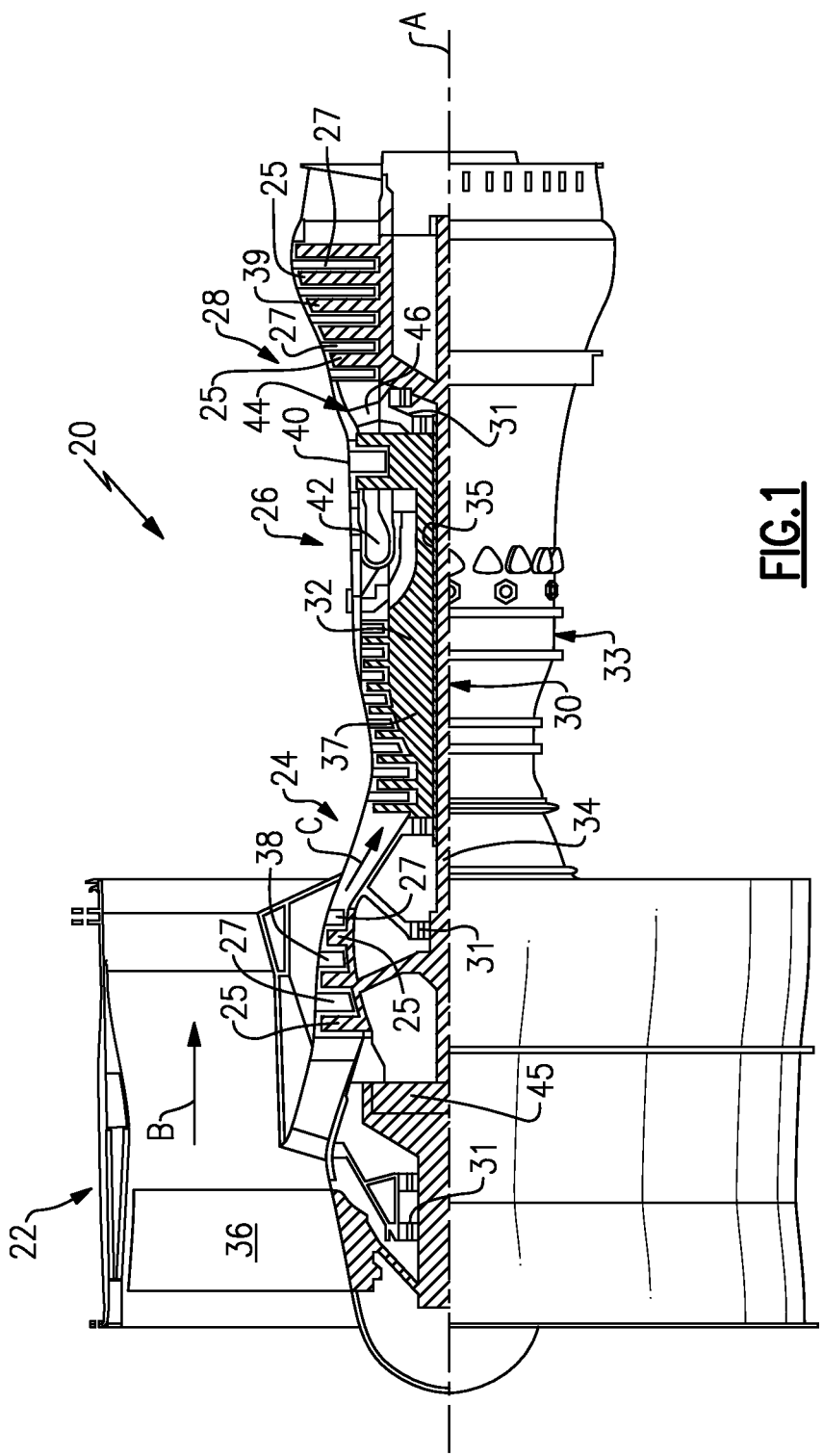
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) or a second bypass stream (not shown) among other systems or features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, and in some configurations a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C. Alternatively, a transition duct may or may not be arranged generally between the high pressure turbine 40 and the low pressure turbine 39.

The inner shaft 34 and the outer shaft 35 are concentric and rotate via the bearing systems 31 about the engine centerline longitudinal axis A, which is co-linear with their longitudinal axes. The core airflow is compressed by the fan 36 and/or the low pressure compressor 38 and the high pressure compressor 37, is mixed with fuel and burned in the combustor 42, and is then expanded through the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be calculated by measuring the pressure prior to the inlet of the low pressure turbine 39 and relating it to the pressure measured at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

The compressor section 24 and the turbine section 28 may include alternating rows of rotor assemblies and vane assemblies (shown schematically) that carry airfoils. For example, rotor assemblies carry a plurality of rotating blades 25, while vane assemblies carry flow directing vanes 27 that extend into the core flow path C to influence the hot combustion gases. The blades 25 extract energy (in the form of pressure) from the core airflow that is communicated through the gas turbine engine 20 along the core flow path C. The vanes 27 direct the core airflow to the blades 25 to extract energy.

Figure 2:
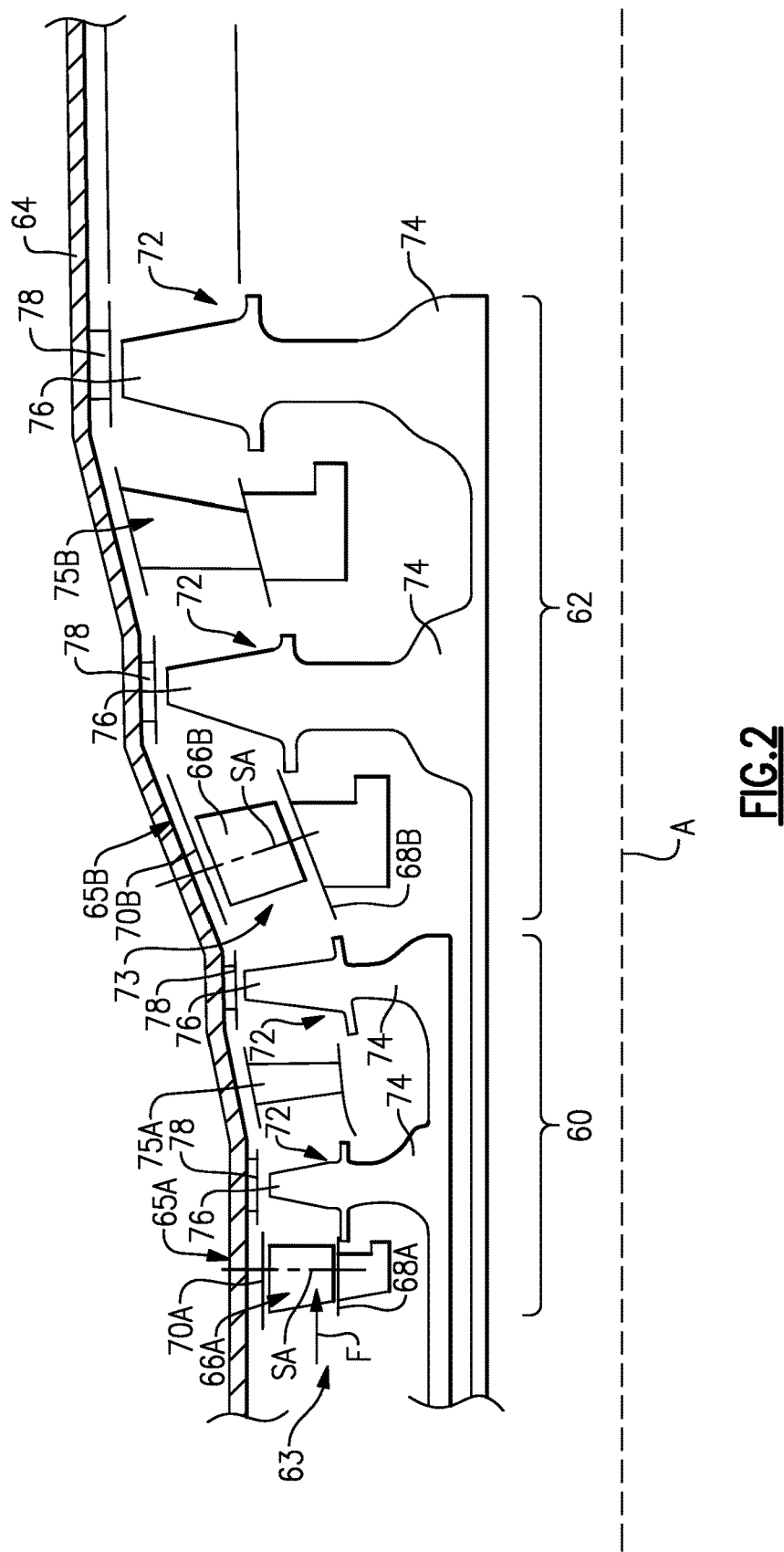
FIG. 2 illustrates a variable area turbine arrangement of a gas turbine engine.

FIG. 2 illustrates a variable area turbine arrangement 100 that may be incorporated into a gas turbine engine, such as the gas turbine engine 20 of FIG. 1, a conventional, non-geared gas turbine engine, or any other type of gas turbine engine. In one embodiment, the variable area turbine arrangement 100 represents a portion of a turbine section of a gas turbine engine. In another embodiment, the variable area turbine arrangement 100 may make up the entire turbine section.

In one embodiment, the variable area turbine arrangement 100 includes a first turbine section 60 (i.e., a high pressure turbine) and a second turbine section 62 (i.e., a low pressure turbine) positioned downstream from the first turbine section 60. However, the variable area turbine arrangement 100 could include additional sections beyond what is illustrated by FIG. 2. For example, in another non-limiting embodiment, the variable area turbine arrangement 100 could include an intermediate pressure turbine disposed between the first turbine section 60 and the second turbine section 62 as part of a three-spool engine architecture.

Each of the first turbine section 60 and the second turbine section 62 includes one or more stages of alternating rows of vanes and blades. In the illustrated embodiment, the first and second turbine sections 60 and 62 both include two stages; however, the first turbine section 60 and the second turbine section 62 could include any number of stages within the scope of this disclosure.

A turbine case structure 64 circumscribes the first turbine section 60 and the second turbine section 62. The turbine case structure 64 represents an outer casing that houses the first turbine section 60 and the second turbine section 62 of the variable area turbine arrangement 100.

In one embodiment, the first turbine section 60 includes a variable vane assembly 65A having at least one variable airfoil 66A. The second turbine section 62 may also include a variable vane assembly 65B having at least one variable airfoil 66B. The variable vane assemblies 65A, 65B may include an array of variable airfoils circumferentially disposed about the engine centerline longitudinal axis A. Alternatively, the variable vane assemblies 65A, 65B could include a combination of both fixed and variable vanes.

In one non-limiting embodiment, the variable vane assembly 65A is positioned at an inlet 63 of the first turbine section 60 and the variable vane assembly 65B is disposed at an inlet 73 of the second turbine section 62. However, the variable vane assemblies 65A, 65B could be disposed elsewhere or in more than one location within the variable area turbine arrangement 100.

The variable vane assemblies 65A, 65B may include any number of variable airfoils 66A, 66B that are selectively configurable to change a flow parameter associated with the variable area turbine arrangement 100. In other words, the variable airfoils 66A, 66B are adjustable to change a flow area of the first and second turbine sections 60, 62 by controlling the amount of core airflow F that is communicated through the first and second turbine sections 60, 62. As is known, the variable airfoils 66A, 66B are pivotable (via an actuation system (not shown)) about a spindle axis SA in order to change the rotational positioning of the variable airfoils 66A, 66B (i.e., change the angle of attack of the variable airfoils relative to core airflow F entering the first and second turbine sections 60, 62). This change in rotational positioning influences the flow area of the variable area turbine arrangement 100.

The variable airfoils 66A, 66B may rotate relative to inner platforms 68A, 68B and outer platforms 70A, 70B of the variable vane assemblies 65A, 65B. The inner platforms 68A, 68B and the outer platforms 70A, 70B may be mounted to the turbine case structure 64 in any known manner.

Each of the first turbine section 60 and the second turbine section 62 may additionally include a second vane assembly 75A, 75B, respectively. In one embodiment, the second vane assembly 75A, 75B is a stationary or fixed vane assembly that includes stationary airfoils that provide a fixed flow area.

A rotor assembly 72 is positioned downstream from each vane assembly of the first turbine section 60 and the second turbine section 62. Each rotor assembly 72 includes at least one rotor disk 74 that carries one or more rotor blades 76. The rotor blades 76 extract energy from the core airflow F, thereby moving the disk 74 and powering various gas turbine engine loads.

The blades 76 rotate relative to blade outer air seals (BOAS) 78 that establish an outer radial flow path boundary for channeling the core airflow F through the variable area turbine arrangement 100. The BOAS 78 may extend from the turbine case structure 64 relative to a tip of each rotating blade 76 in order to seal between the blade 76 and the turbine case structure 64.

Altering the flow area associated with the variable area turbine arrangement 100 by moving the variable airfoils 66A, 66B changes the pressure distributions of the variable vane assemblies 65A, 65B as well as nearby hardware (i.e., the rotor assemblies 72, vane assemblies 75A, 75B, BOAS 78, etc.). These pressure distribution changes can alter the amount of cooling fluid necessary to condition the vanes and other nearby hardware. Arrangements for simultaneously actuating the variable vane assemblies 65A, 65B and addressing these cooling needs are detailed below with respect to FIGS. 3-6.

Figure 3:
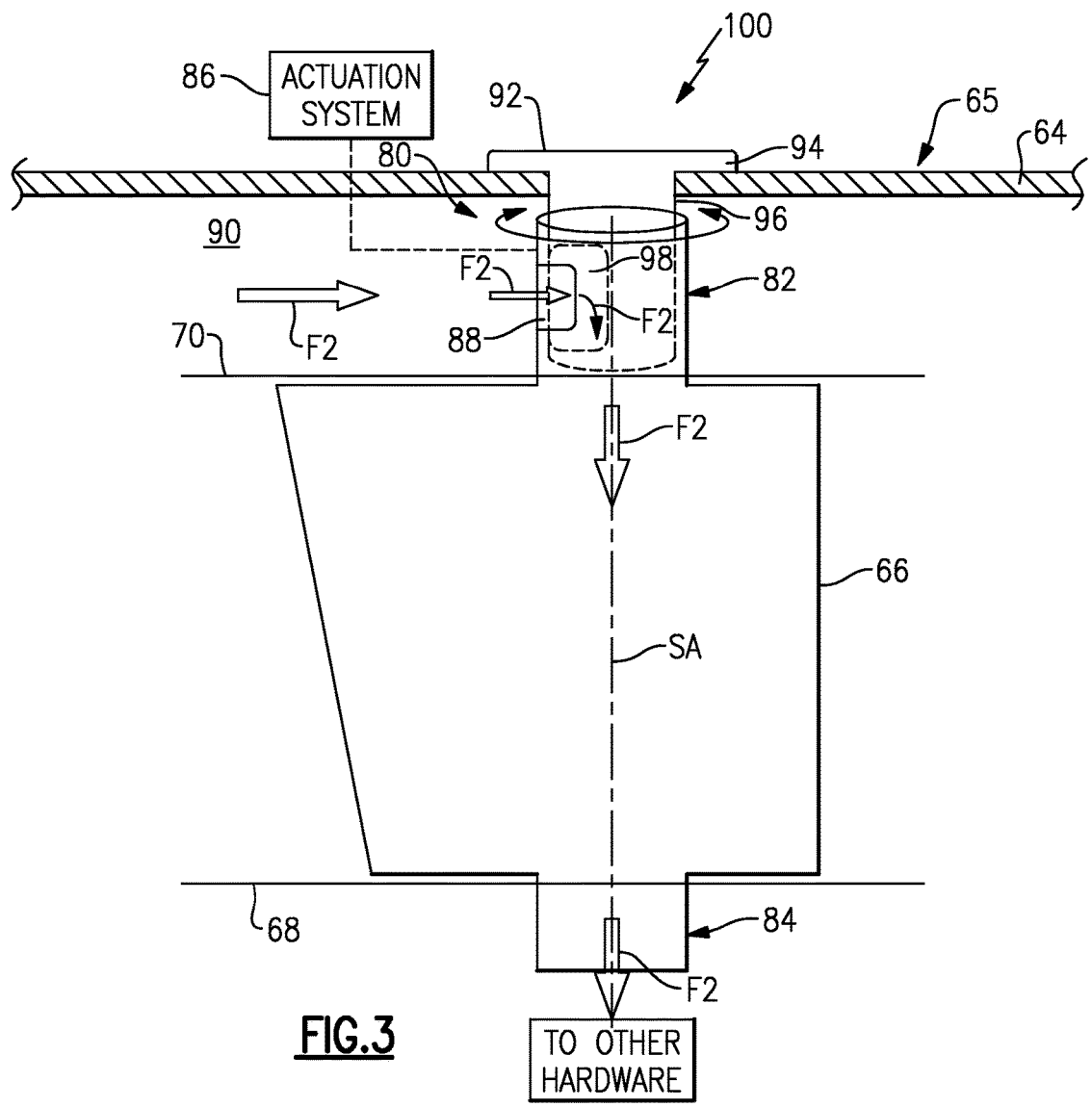
FIG. 3 illustrates a variable vane assembly and associated secondary flow system of a variable area turbine arrangement.

FIG. 3 illustrates a variable vane assembly 65 and associated secondary flow system 80 that may be incorporated into a variable area turbine arrangement 100. In one embodiment, the functionality of the variable vane assembly 65 and the secondary flow system 80 are synchronized to address the cooling needs of the hardware of the variable area turbine arrangement 100. These cooling needs may vary due to the pressure distribution changes that are caused by altering a flow area of the variable area turbine arrangement 100 (i.e., by altering a rotational positioning of a variable airfoil 66).

In one embodiment, the variable airfoil 66 of the variable vane assembly 65 extends between an outer spindle 82 and an inner spindle 84. The outer spindle 82 extends through an outer platform 70 and the inner spindle 84 extends through an inner platform 68. An actuation system 86 (shown schematically) is configured to rotate the variable airfoil 66 about a spindle axis SA that extends through the outer spindle 82 and the inner spindle 84. The actuation system 86 could include a synchronizing ring system, a ring gear system, or any other system suitable to move the variable airfoil 66 to change a flow area of the variable area turbine arrangement 100. At least one of the spindles 82, 84 (here, the outer spindle 82) may include a window 88 for receiving a cooling fluid F2 from the secondary flow system 80, additional details of which are discussed below.

The secondary flow system 80 communicates the cooling fluid F2 relative to the variable vane assembly 65. In one embodiment, the cooling fluid F2, which may be bleed airflow from a compressor section of the gas turbine engine, is communicated in a cavity 90 that extends between the turbine case structure 64 and the outer platform 70 of the variable vane assembly 65. The cooling fluid F2 is directed toward the window 88 of the outer spindle 82, in one embodiment.

A tube 92 may be positioned inside of the outer spindle 82. The tube 92 includes a flange 94 that abuts the turbine case structure 64 and a tube body 96 that extends into the outer spindle 82. The tube body 96 may include at least one port 98. In one embodiment, the at least one port 98 is at least partially radially aligned with the window 88 of the outer spindle 82, such that when aligned, the cooling fluid F2 may enter inside of the variable airfoil 66 through the aligned window 88 and port 98.

In one embodiment, the actuation system 86 moves the outer spindle 82, such as by rotation, relative to the tube 92 in order to cover or uncover the port 98 and control an amount of the cooling fluid F2 permitted to enter the variable airfoil 66 through the port 98. For example, the outer spindle 82 may move between a first position in which the port 98 is completely covered by the outer spindle 82 and a second position in which the port 98 at least partially aligns with the window 88 to permit a portion of the cooling fluid F2 to enter through the port 98, or any intermittent position between fully covered and fully uncovered. The cooling fluid F2 may then be communicated to condition the variable airfoil 66 and other nearby hardware. The amount of cooling fluid F2 permitted to enter the port 98 can be modulated by changing a rotational positioning of the variable airfoil 66 and the outer spindle 82. In this way, modulation of the flow of the cooling fluid F2 is linked to the function of the variable vane assembly 65.

FIGS. 4A-4D illustrate additional embodiments of a variable vane assembly 165 and associated secondary flow system 180 that are linked to simultaneously vary a flow area and address variable cooling needs of the hardware of a variable area turbine arrangement 100. In this disclosure, like reference numerals designate like elements where appropriate and reference numerals with the addition of 100 or multiples thereof designate modified elements that are understood to incorporate the same features and benefits of the corresponding original elements.

In the embodiment of FIG. 4A, a variable vane assembly 165-1 includes a variable airfoil 166-1, an outer spindle 182-1, an inner spindle 184-1 and an actuation system 186-1. The actuation system 186 can rotate the variable airfoil 166-1 about a spindle axis SA that extends through the outer spindle 182-1 and the inner spindle 184-1. At least one of the spindles 182-1, 184-1 (here, the inner spindle 184-1) may include a window 188-1 for communicating a cooling fluid F2 to a portion of the secondary flow system 180.

For example, the secondary flow system 180-1 may include a tangential on-board injector (TOBI) assembly 150-1 positioned radially inboard of the variable vane assembly 165-1. The TOBI assembly 150-1 may be a cast ring style or tube style. The function of the TOBI assembly 150-1 is to orient the secondary cooling flow delivered through the airfoils of the variable vane assembly 165 such that pressure losses are minimized as the cooling flow is introduced to the downstream rotor assembly. The TOBI assembly 150-1 includes a passage 152-1 that may selectively align with the window 188-1 to direct cooling fluid F2 to downstream hardware. In one embodiment, the TOBI assembly 150-1 may direct cooling fluid F2 to blades and disks of downstream rotor assemblies.

In one non-limiting embodiment, the secondary flow system 180-1 communicates the cooling fluid F2 into the variable vane assembly 165-1 via the outer spindle 182-1. The cooling fluid F2 may travel through the interior of the variable airfoil 166-1 until it reaches the inner spindle 184-1. Once inside the inner spindle 184-1, the cooling fluid F2 is directed toward the window 188-1.

In one embodiment, the actuation system 186-1 rotates the variable airfoil 166-1 (via the outer spindle 182-1) to move the inner spindle 184-1 relative to the TOBI assembly 150-1, thereby covering or uncovering the window 188-1 to control an amount of cooling fluid F2 permitted to exit the window 188-1 and enter the passage 152-1. For example, the inner spindle 184-1 may move between a first position in which the window 188-1 is completely blocked by a surface of the TOBI assembly 150-1 and a second position in which the window 188-1 at least partially aligns with the passage 152-1 to permit a portion of the cooling fluid F2 to enter the passage 152-1. The cooling fluid F2 may then be communicated to condition nearby hardware. The amount of cooling fluid F2 permitted to enter the passage 152-1 can be modulated by changing the rotational positioning of the variable airfoil 66 and inner spindle 184-1. In this way, modulation of the flow of the cooling fluid F2 through the secondary flow system 180-1 is linked to actuation of the variable vane assembly 165-2.

Referring to FIG. 4B, another embodiment of a variable vane assembly 165-2 could include multiple windows 188-2A, 188-2B for modulating cooling fluid F2 through multiple passages 152-2A, 152-2B of a TOBI assembly 150-2 of a secondary flow system 180-2. Similar to the FIG. 4A embodiment, the variable vane assembly 165-2 can be moved (by rotating a variable airfoil 166-2 via an actuation system 186-2) to simultaneously modulate the flow of cooling fluid F2 through the TOBI assembly 150-2 to address the cooling needs of nearby hardware. For example, the cooling fluid F2 can be used to cool both radially outboard hardware (vane and blade platforms, etc.) through the passage 152-2B and radially inboard hardware (disks, etc.) through the passage 152-2A. A positioning of the windows 188-2A, 188-2B relative to the passages 152-2A, 152-2B can be controlled to modulate the amount of cooling fluid F2 permitted to enter each of the passages 152-2A, 152-2B.

FIGS. 4A and 4B illustrate two non-limiting embodiments of possible window/passage configurations. It should be appreciated that various other window/passage configurations can additionally or alternatively be provided.

Figure 4D:
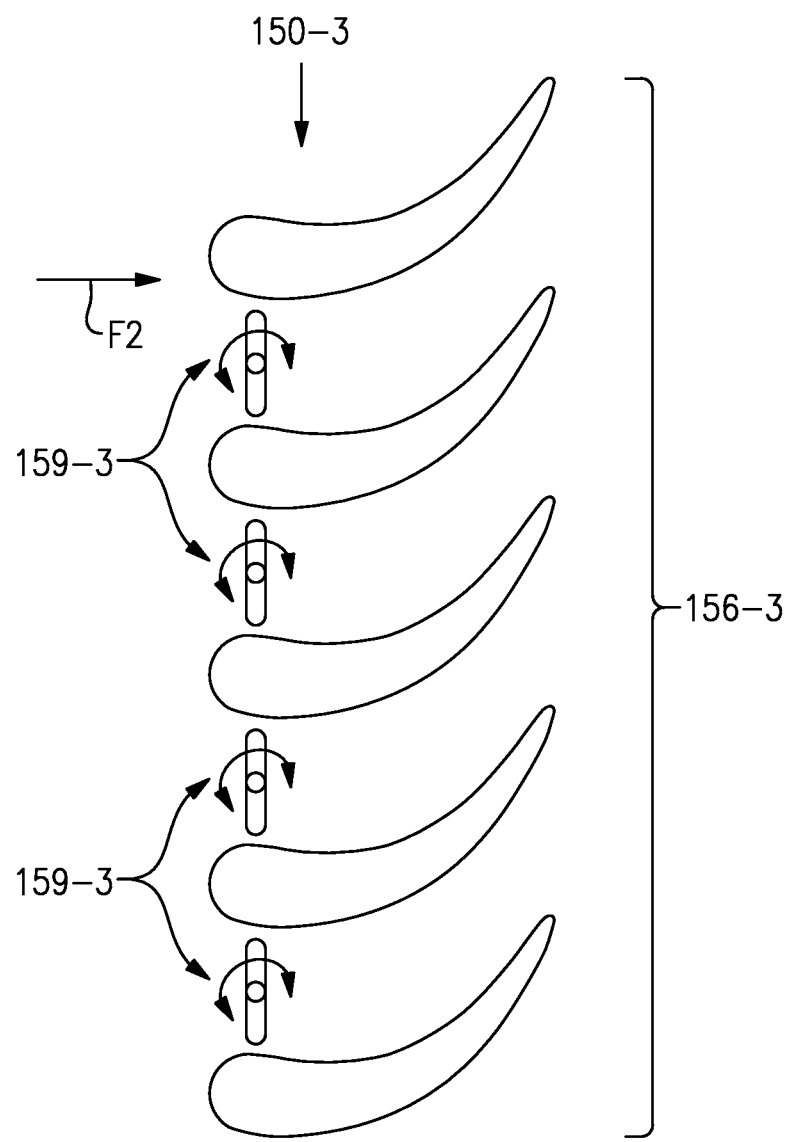

Another variable vane assembly 165-3 and associated secondary flow system 180-3 are illustrated in FIG. 4C. In this embodiment, a spindle 184-3 (here, an inner spindle) of the variable vane assembly 165-3 is mechanically linked to an exit nozzle vane 156-3 of a TOBI assembly 150-3 of the secondary flow system 180-3 by a linkage assembly 151-3. In one embodiment, the linkage assembly 151-3 includes a spur gear 153-3 connected to the spindle 184-3 and a lever arm 155-3 connected to the exit nozzle vane 156-3 (or a rotating blocker 159-3 such as shown in FIG. 4D, which is section A-A of FIG. 4C). Actuation of the variable vane assembly 165-3 by an actuation system 186-3 can simultaneously modulate a flow of a cooling fluid F2 through the TOBI assembly 150-3 by changing a rotational positioning of the exit nozzle vane 156-3.

Alternatively, the linkage assembly 151-3 may be connected to a rotating blocker 159-3 positioned between adjacent exit nozzle vanes 156-3 (See FIG. 4D). The rotating blocker 159-3 may be moved simultaneously with movement of the variable vane assembly 165-3 to modulate a flow of a cooling fluid F2 through the TOBI assembly 150-3. In one embodiment, the rotating blocker 159-3 is moved by changing a rotational positioning of the variable vane airfoils 166-3.

Figure 5:
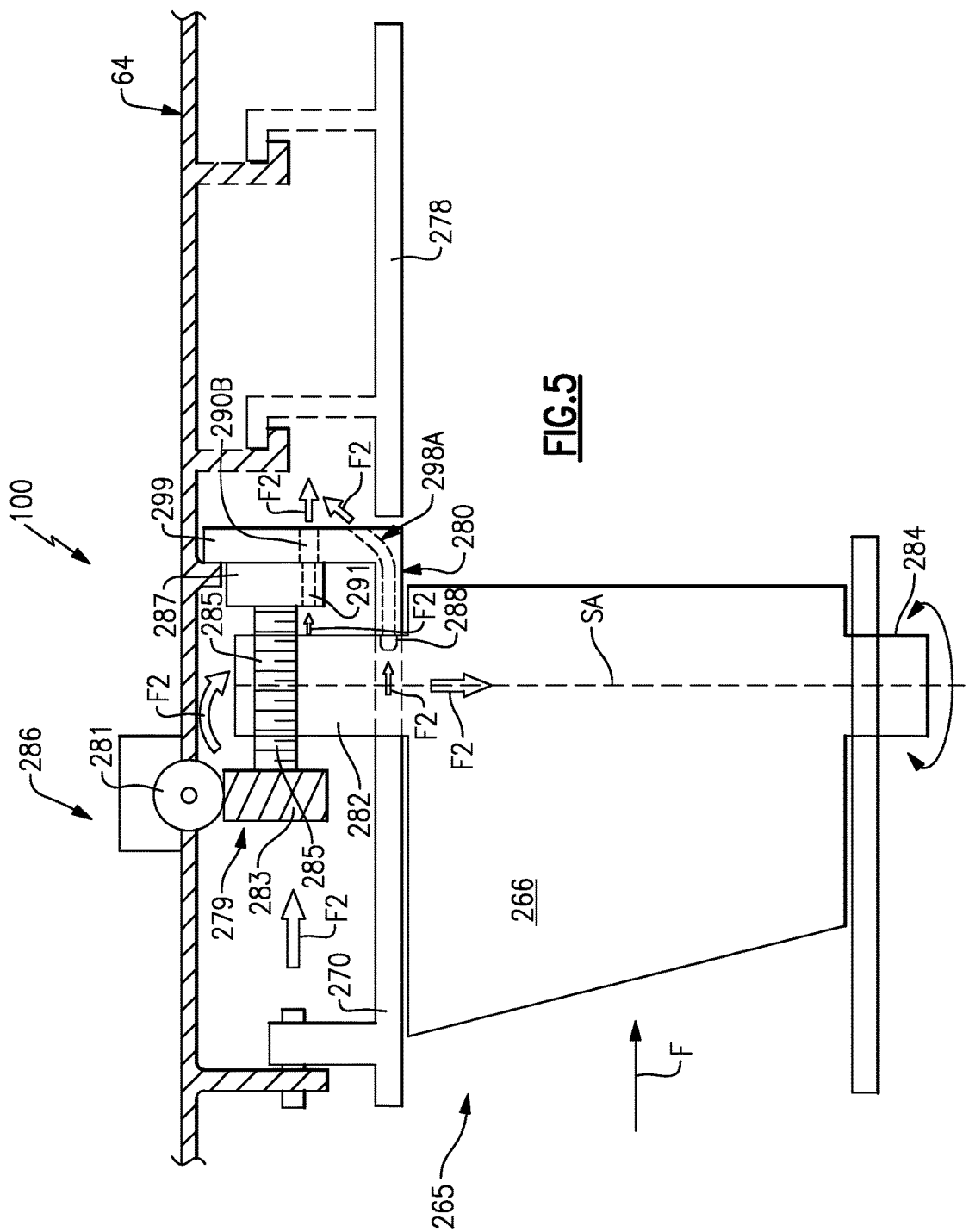
FIG. 5 illustrates yet another variable vane assembly and associated secondary flow system.

FIG. 5 illustrates another exemplary variable vane assembly 265 and associated secondary flow system 280. In this embodiment, the variable vane assembly 265 includes a variable airfoil 266 that extends between an outer spindle 282 and an inner spindle 284 that span a spindle axis SA. An actuation system 286 is configured to rotate the variable airfoil 266 about the spindle axis SA to change a direction of core airflow F communicated across the variable airfoil 266 and vary the flow area of a variable area turbine arrangement 100.

In one embodiment, the actuation system 286 includes a gear system 279 suitable to move the variable airfoil 266 to change a flow area associated with the variable area turbine arrangement 100. The gear system 279 includes a first gear 281, a second gear 283, a third gear 285 and a fourth gear 287. In one embodiment, the first gear 281 is a worm gear, the second and fourth gears 283, 287 are ring gears and the third gear 285 is a bevel spur gear. Of course, other gear combinations may be suitable for use in the gear system 279.

In one embodiment, the actuation system 286 provides motive force to the worm gear 281. The worm gear 281 drives the outer surface of the ring gear 283. The aft face of the ring gear 283 has a bevel gear tooth arrangement that drives the bevel spur gear 285. The bevel spur gear 285 then drives a bevel gear tooth arrangement on the ring gear 287, which may feature cooling air ports 291. In one embodiment, the bevel spur gear 285 is directly attached to the variable vane outer spindle 282. Thus, when the bevel spur gear 285 rotates so does the variable vane airfoil 266.

At least one of the spindles 282, 284 (here, the outer spindle 282) may include a window 288 for communicating a cooling fluid F2 into a port 298A of the secondary flow system 80. In one embodiment, the port 298A extends through an outer platform 270. The window 288 is selectively exposed to the port 298A during movement of the variable airfoil 266 (via the actuation system 286 and the rotation of the bevel spur gear 285) to modulate a flow of the cooling fluid F2 through the port 298A. The cooling fluid F2 that is channeled through the port 298A may be communicated to condition downstream hardware, including but not limited to a BOAS 278.

Alternatively or additionally, the secondary flow system 280 may include a second port 298B disposed through a rail 299 of the outer platform 270. In one embodiment, a portion of the gear system 279 (here, the fourth gear 287) acts as a port blocker to selectively block the flow of cooling fluid F2 into the second port 298B. In one embodiment, the fourth gear 287 includes the port 291 that may align with the second port 298B during rotation of the fourth gear 287 to modulate the amount of cooling fluid F2 permitted to enter the second port 298B. In this way, modulation of the flow of the cooling fluid F2 is directly linked to the actuation system 286. The cooling fluid F2 that is channeled through the second port 298B may condition downstream hardware, including but not limited to the BOAS 278.

FIG. 6 illustrates yet another variable vane assembly 365 and associated secondary flow system 380 that may be incorporated into a variable area turbine arrangement 100. In this embodiment, the variable vane assembly 365 and the secondary flow system 380 may be simultaneously actuated to vary a flow area and address variable cooling needs of the hardware of the variable area turbine arrangement 100.

The variable vane assembly 365 may include a variable airfoil 366 that extends between an outer spindle 382 and an inner spindle 384 that extend along a spindle axis SA. An actuation system 386 is configured to rotate the variable airfoil 366 about the spindle axis SA.

In one embodiment, the actuation system 386 is configured to move the variable airfoil 366 to change a flow area associated with the variable area turbine arrangement 100. The actuation system 386 may include a first bevel gear 391, a second bevel gear 393, a spur gear 395, a sync ring 399, and a vane arm 301. In one embodiment, motive force delivered through a shaft 307 rotates the first bevel gear 391. The first bevel gear 391 meshes with the second bevel gear 393, thereby rotating it. Mounted on the same shaft as second bevel gear 393 is the spur gear 395. Rotation of the second bevel gear 393 thus rotates the spur gear 395. Spur gear 395 meshes with gear tooth features on the outer circumference of the sync ring 399. Rotational drive of the sync ring 399 by the spur gear 395 results in articulation of the individual vane arms 301 connected to variable vane airfoils 366, thereby rotating the variable vane airfoils 366.

In one embodiment, the secondary flow system 380 may include one or more cooling pipes 303 for directing a cooling fluid F2 to the variable area turbine arrangement 100. The cooling pipe 303 may house a modulation valve 305 that is mechanically linked to the actuation system 386 via the shaft 307. In one embodiment, the modulation valve 305 is a butterfly valve. In operation, actuation of the variable airfoil 366 by the actuation system 386 simultaneously adjusts a positioning of the modulation valve 305 to modulate a flow of the cooling fluid F2 that is permitted to enter the variable airfoil 366.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A variable area turbine arrangement, comprising:
a variable vane assembly;
a secondary flow system associated with said variable vane assembly and including a TOBI assembly; and
wherein flow modulation of a cooling fluid through said secondary flow system is changed simultaneously with actuation of said variable vane assembly.

2. The variable area turbine arrangement as recited in claim 1, wherein said variable vane assembly includes a spindle having a window, and said TOBI assembly includes at least one passage that is selectively exposed to said window to alter an amount of said cooling fluid communicated through said secondary flow system.

3. The variable area turbine arrangement as recited in claim 1, wherein said variable vane assembly includes a spindle, and said TOBI assembly including at least one exit nozzle vane linked to said spindle through a linkage assembly.

4. The variable area turbine arrangement as recited in claim 3, wherein said linkage assembly includes a spur gear connected to said spindle and a lever arm connected to said exit nozzle vane.

5. The variable area turbine arrangement as recited in claim 1, wherein said variable vane assembly includes a spindle, and said TOBI assembly includes at least one rotating blocker linked to said spindle through a linkage assembly.

6. The variable area turbine arrangement as recited in claim 1, wherein said variable vane assembly includes a spindle, and said spindle includes a window for communicating fluid to said secondary flow system.

7. The variable area turbine arrangement as recited in claim 1, wherein said TOBI assembly is cast ring style or tube style.

8. The variable area turbine arrangement as recited in claim 1, wherein said spindle includes a second window, and said TOBI assembly includes a second passage that is selectively exposed to said second window to alter an amount of said cooling fluid communicated through said secondary flow system.

9. A gas turbine engine, comprising:
a turbine section;
a variable vane assembly disposed within said turbine section;
a secondary flow system including a TOBI assembly and configured to communicate a cooling fluid to at least one of said variable vane assembly and nearby hardware of said turbine section; and
a portion of said variable vane assembly configured to move and simultaneously modulate a flow of said cooling fluid through said secondary flow system.

10. The gas turbine engine as recited in claim 9, wherein said variable vane assembly includes a variable airfoil that is movable to modulate said flow of said cooling fluid.

11. The gas turbine engine as recited in claim 9, comprising an actuation system that is configured to modulate said flow of said cooling fluid.

12. The gas turbine engine as recited in claim 9, wherein said TOBI assembly is radially inboard of said variable vane assembly.

13. The gas turbine engine as recited in claim 9, wherein said secondary flow system includes at least one of a port, a nozzle, a passage and a modulation valve.

14. A method, comprising:
moving a portion of a variable vane assembly to alter flow area associated with a variable area turbine arrangement; and
simultaneously with the step of moving, modulating a flow of a cooling fluid through a secondary flow system associated with the variable vane assembly and including a TOBI assembly.

15. The method as recited in claim 14, wherein the step of moving includes utilizing a variable airfoil of the variable vane assembly to modulate the flow through the secondary flow system.

16. The method as recited in claim 14, wherein the step of moving includes utilizing an actuation system to modulate the flow through the secondary flow system.

17. The method as recited in claim 14, comprising the step of conditioning a variable airfoil of the variable vane assembly with the cooling fluid.

18. The method as recited in claim 14, comprising the step of conditioning nearby hardware of the variable area turbine arrangement with the cooling fluid.

19. The method as recited in claim 14, wherein said step of moving includes selectively aligning a passage of said TOBI assembly with a window to direct said cooling fluid to downstream hardware.

20. The method as recited in claim 14, wherein said step of moving includes rotating a variable airfoil to move a spindle relative to said TOBI assembly to control an amount of said cooling fluid permitted to exit a window.

\* \* \* \* \*